United States Patent Office 3,527,510
Patented Sept. 8, 1970

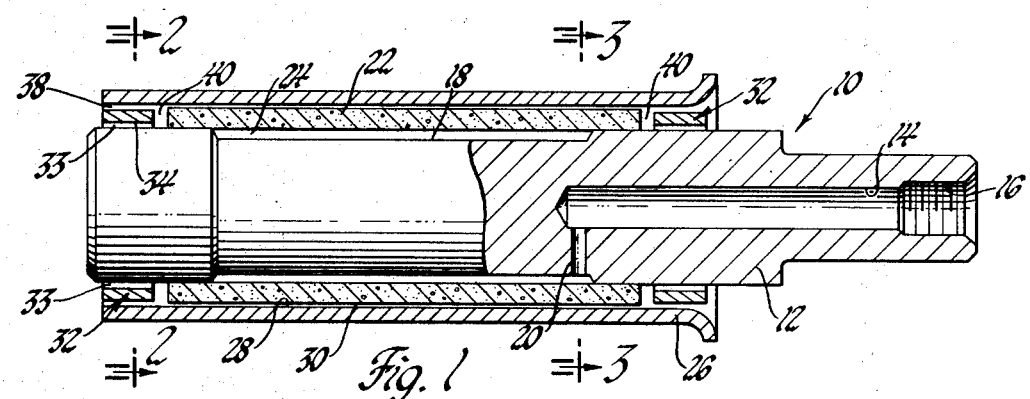
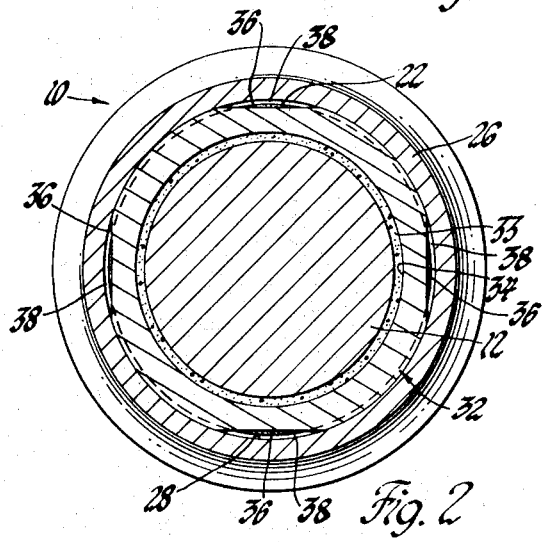
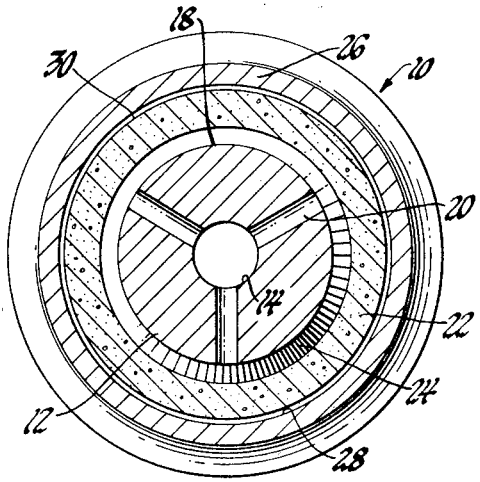
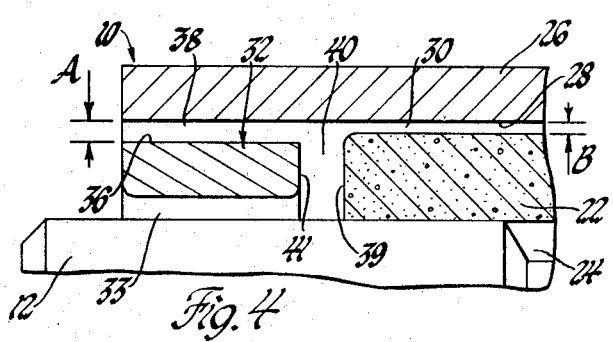
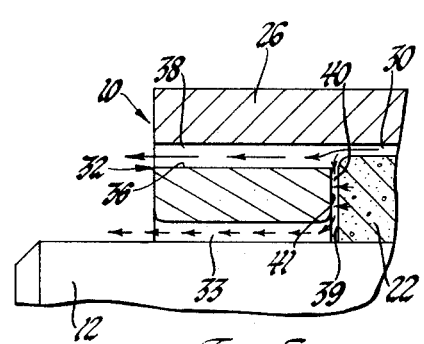
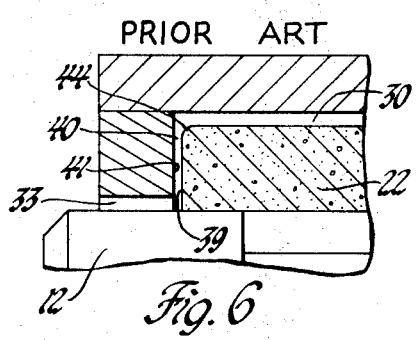
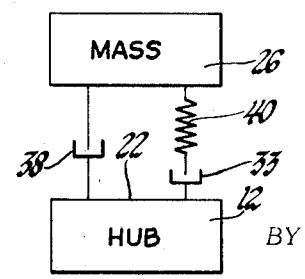

3,527,510
ANTIHAMMER DEVICE FOR AIR SPINDLES
Paul J. Christiansen, Sandusky, Ohio, assignor to General Motors Corporation, Detroit, Mich., a corporation of Delaware
Filed Dec. 5, 1968, Ser. No. 781,415
Int. Cl. F16c 1/24
U.S. Cl. 308—107                                    13 Claims

ABSTRACT OF THE DISCLOSURE

A porous sleeve air bearing separator roll used in textile drawing or spinning machinery is provided with flats in the margins of its thrust rings to provide a passage for the escape of air from the annular clearance between the porous sleeve and the outer rotatable shell to eliminate air hammer.

---

My invention relates generally to separator rolls used in textile machines and more particularly to separator rolls supported on an air bearing or cushion of air.

Due to increased speeds, higher temperature operations especially in the drawing of synthetic yarns, and the desire for a lubricant which will not contaminate yarn filaments, the air bearing separator roll offers many advantages over the use of conventional separator rolls supported on an antifriction bearing. A typical air bearing separator roll is shown in the U.S. patent to Voorhies 3,374,039 and my invention is directed toward an improvement over this general type of separator roll in which a porous sleeve has exposed thrust faces which cooperate with thrust rings mounted on the roll shell to provide a thrust capacity for the separator roll. In its operating environment, the separator roll has a yarn strand wound around the roll shell a number of times in a spiral fashion. As the yarn strand is drawn over the separator roll under tension, the roll shell is rotated. Depending upon its application, the tension of the yarn may also produce a small axial force on the roll shell. In addition, the orientation of the roll shell may be horizontal, vertical, or tilted depending on the particular textile machine with which it is used. Then too, the particular textile machine may be vibrating to some extent and may impart some of this vibration to parts of the separator roll. Any or all of these factors may contribute to producing an exciting force which may cause the separator roll to experience an instability phenomenon known as air hammer which is characterized by the roll shell vibrating axially on the hub. The air hammer in turn destroys the air film providing the thrust capacity for the roll shell thereby allowing contacct between the thrust rings and the end faces of the porous sleeve which produces friction and wear between the rubbing surfaces and reduces the life of the separator roll. Accordingly, it is the object of my invention to provide an air bearing separator roll which is relatively stable in the axial direction and eliminates air hammer.

It is another object of my invention to provide a separator roll having a porous sleeve with exposed end faces which cooperate with thrust rings on the roll shell to give a thrust capacity to the roll shell and yet eliminate air hammer.

It is another object of my invention to provide an air bearing separator roll in which the thrust rings on the roll shell have air passage means through them adjacent the inner circumference of the roll shell to reduce the radial flow across the face of the thrust rings to eliminate air hammer. It is another object of my invention to provide a roll shell which incorporates damping means in the thrust ring to prevent the instability phenomenon of air hammer when the roll shell is excited.

It is another object of my invention to provide a separator roll in which the cross flow between the radial load supporting air film and the thrust supporting air film is minimized to eliminate air hammer.

It is another object of my invention to provide a separator roll in which the spring effect of the thrust carrying air film is minimized and in which the damping effect of air passages is sufficient to eliminate air hammer in the operating regime of the separator roll.

Other objects and features of the invention will become apparent to those skilled in the art as the disclosure is made in the following detailed description of a preferred embodiment of the invention as illustrated in the accompanying sheet of drawing in which:

FIG. 1 is a section taken through the axis of a separator roll in accordance with my invention.

FIG. 2 is a section taken along the line 2—2 of FIG. 1 showing the left thrust ring of FIG. 1 and its relationship to the roll shell, the porous sleeve, and the hub.

FIGURE 3 is a section taken along the line 3—3 of FIG. 1 and looking in the direction of the arrows.

FIG. 4 is an enlarged view of a portion of FIG. 1 showing the relationship between the left thrust ring, the roll shell, the hub, and the porous sleeve under a condition where the roll shell is substantially centered on the hub.

FIG. 5 is a view similar to FIG. 4 showing the relationship of the roll shell to the hub when an axial force has been applied to the roll shell such that the space between the end face of the porous sleeve and the thrust ring is substantially diminished.

FIG. 6 is a view similar to FIG. 5 showing a similar condition on a roll shell of the prior art.

FIG. 7 is a schematic of a vibrating system used to explain a theory of operation of the separator roll shown in FIG. 1.

Referring now to the drawings and more specifically to FIG. 1, the separator roll is shown generally at 10 and includes a hub 12 with a blind bore 14 which has its end portion for mounting on a textile machine and which is suitably threaded at 16 for connection to an air supply conduit (not shown). The bore 14 communicates with an enlarged annular groove 18 in the surface of the hub 12 through a number of radial passages 20. A porous sleeve 22 snugly and nonrotatably mounted on the hub forms a plenum 24 with the groove 18. This plenum 24 is supplied with pressurized air through the radial passages 20 and the bore 14 from a source of pressurized air, not shown.

A cylindrical roll shell 26 surrounds the porous sleeve 22 with its cylindrical inner circumferential surface 28 spaced closely adjacent the outer circumference of the porous sleeve 22. The diameter of the surface 28 is a few thousandths larger than the outer diameter of the porous sleeve so that the pressurized air in plenum 24 permeating or flowing through the porous sleeve 22 develops a load carrying film in the annular space 30. This load carrying film or cushion of air supports a radial load and allows the roll shell 26 to rotate at relatively high speeds with little or no friction and contact between the roll shell and the porous sleeve.

An annular thrust ring 32 is press fit into each end of the roll shell. The inner circumference 34 of the thrust ring 32 is spaced from the hub with the radial clearance between the thrust ring 32 and the hub 12 normally being greater than the radial clearance between the roll shell 26 and the porous sleeve 22. The annular openings 33 thus formed provide a passage for air to exhaust out of the bearing as will be explained more fully hereinafter. The thrust ring 32 has four equally circumferentially spaced flats 36 machined into its outer circumferential margin as can be seen in FIG.

2. In FIG. 2, the size of the flats has been greatly exaggerated for clarity. In actual practice, the size of the flats range from 0.004 inch to 0.010 inch in depth on separator rolls which range in nominal outside diameters from ½ inch to 2⅛ inch and in length from ¾ inch to 9 inches.

Referring now to FIG. 4 which shows an enlargement of a typical flat 36, it can be seen that the flat provides air passages 38 through the thrust ring 32 at its outer circumference adjacent the inner circumference 28 of the roll shell 26. As mentioned above, the depth A of the flat ranges from .004 inch to 0.01 inch. The depth A is larger than the clearance B between the outer circumference of the porous sleeve 22 and the inner circumference 28 of the roll shell 26. As is shown in FIG. 4, the thrust air space 40 between the exposed end face 39 of the porous sleeve 22 and the inboard face 41 of the thrust ring 32 is approximately equal to the depth of the flat 38 when the roll shell is approximately centered. The sum of the spaces 40 at each end of the separator roll is referred to as end play and is normally about five to ten times greater than the radial clearance between the porous sleeve 22 and the roll shell 26. As the space 40 diminishes on one side of the separator roll, the pressure in the air film on this one side is increased and it is able to sustain a high thrust load. The porous sleeve 22 which may be of porous bronze, porous ceramic, or a similar material has its porosity adjusted such that the flow out the end faces 39 is between 12% and 50% of the flow out of the circumferential surface with the flow out each end face 39 preferably being about equal.

Just exactly what the precise mechanism which prevents air hammer in my invention is not clearly understood, however, an explanation of the mechanism as I presently understand it will now be given in conjunction with FIGS. 5 and 6. In FIG. 5, the roll shell 26 has been moved to the right relative to the hub 12 and porous sleeve 22 by some exciting force which may be due to the tilt of the separator roll, vibration of the textile machine, the tension and wind-up of the yarn or a combination of one or more of them. This movement toward the right diminishes the space 40 decreasing the pressure in the air in this area.

In the prior art type device shown in FIG. 6 where the only escape for the pressurized air in the annulus 30 was through the clearance 33, all of the air escaping from this end of the bearing had to flow radially through the diminished space 40. It is thought that this restriction is so great that the pressure built up to an extent such that the thrust surfaces were pushed apart, reducing the restriction and pressure and increasing or dumping the air flow until the axial force was again sufficient to reduce the restriction. This phenomenon is cyclic with a relatively high frequency so that the shell 12 vibrated at what appeared to be a natural resonant frequency. There is also evidence to indicate a complete destruction of the air film in the space 40 and contact of the faces 39 and 41. In such a situation, the phenomenon is explainable as a valving action with the valve rapidly opening and closing. This valving action theory is based on the fact that the manufacture of the porous sleeve 22 produces a rounded corner 44 which provides a piston surface for the air to act against when the "valve" is closed, that is, when faces 39 and 41 contact.

Returning to FIG. 5, it is believed that in my invention that a substantial portion of the air from the film in the radial clearance 30 flows axially out of the separator roll through the passages 38. The air flow through the end face 39 of the porous sleeve 22 is sufficient to carry the axial thrust and it appears that any cross flow, that is, air escaping from the clearance 30 out of the clearance 33 through the space 41 is rather minimal and not sufficient to cause the phenomenon as explained in conjunction with the prior art. This is shown graphically in FIG. 5 where the larger airflow from the clearance 30 is shown by the larger arrows as exhausting through the passage 38 with possibly a small amount cross flowing through the space 40 and out the clearance 33 which also is the flow path for the smaller flow through the end face 39 of the porous sleeve 22 as indicated by the smaller arrows. It is to be noted that there is always an escape for the pressurized air in the clearance 30 through passages 38 regardless of the relationship of the faces 39 and 41.

I have found that the size of the passages 38 formed by the flats on the thrust rings 32 is related to the size of the separator roll and more particularly appears to be more related to the diameter. Upon relating the cross sectional areas of the passages 38 which in the instant disclosure consists of four equally circumferentially spaced passages bounded by the flats in the thrust ring and the inner circumference of the roll shell to the cross sectional area of the clearance 30. I have found that separator rolls operate without air hammer when the cross sectional area of the passages is approximately 40% of the cross sectional area of the clearance when connected to a source of air from 50 to 90 p.s.i.g. which is a normal supply of air. I have also found separator rolls successful with the cross sectional area of the passages as high as approximately 100% of the cross sectional area of the clearance 30. Tests also indicate that while equal circumferential spacing of the passages may be preferable, it is not absolutely critical.

A specific example of a separator roll which I found successful was manufactured in accordance with the following specifications: nominal size—1¼" x 3"; roll shell I.D.—1.1343"; bushing O.D.—1.1328"; end play—.007 to .012"; flat depth—.007"; thrust ring I.D.—.645"; hub O.D.—.6247"; radial flow through bushing @ 50 p.s.i.g.—13 to 25 std. ft.³/hr.; axial flow through end face @50 ps.i.g—3 to 7 std. ft.³/hr. In a separator roll made in accordance with the above specifications except that the flats were only 0.003 inch deep, I was able to induce an air hammer phenomenon by axially loading the roll shell.

Another explanation of the mechanism preventing "air hammer" in my invention is by analogy to a vibrating system such as shown in FIG. 7. In this instance, the roll shell 26 is represented as a mass which is supported in the axial direction on the hub 22 on a cushion of air in the space 40. Air being a compressible gas is elastic and can be thought of as a spring. As in all vibrating systems, the mass or roll shell when properly excited vibrates at a natural frequency and continues to do so until the vibration energy is dissipated or damped. The frictional flow losses through the clearance 33 can be thought of as a damper 33 in series with the "air spring" 40. The situation thus far is comparable to the prior art illustrated in FIG. 6. However, the passages 38 add a second damper 38 to the vibrating system. The second damper 38 is parallel to the spring 40 and damper 33 in series which greatly alters the resonant frequency of the system not only by adding the second damper but also by changing the characteristics of the "air spring" 40. Using this analogy, the addition of the second damper 38 alters the system such that the resonant frequency is beyond the operating regime of the separator roll.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

I claim:

1. A separator roll or the like comprising in combination, a hub, porous sleeve means on said hub with its end faces and outer circumferential surface exposed, a plenum in said hub opening onto the interior circumferential surface of said porous sleeve means, means to connect said plenum to a source of pressurized air, a roll shell surrounding said porous sleeve means with its inner circumferential surface spaced closely adjacent the outer circumferential surface of said porous sleeve with a small clearance therebetween whereby air permeates through said porous sleeve and establishes a radial load carrying flowing film layer of air in said clearance between said porous sleeve and said roll shell when said plenum is connected to a source of pressurized air, a thrust ring adjacent each end of said roll shell spaced closely adjacent the outboard end faces of said porous sleeve means, respectively, first passage means including the inner circumference of said thrust rings and second passage means through said thrust rings adjacent said outer shell whereby a substantial portion of the air from said radial load carrying film layer escapes through said second passage means to prevent air hammer.

2. A separator roll or the like as defined in claim 1 wherein the porosity of the porous sleeve means is such that the flow through the outboard end faces is approximately from 12% to 50% of the radial flow through the circumference of said porous sleeve means.

3. A separator roll as defined in claim 1 wherein said second passage means has a cross sectional area at least 40% as great as the cross sectional area of the clearance between said roll shell and said porous sleeve means.

4. A separator roll or the like as defined in claim 2 wherein said second passage means has a cross sectional area at least 40% as great as the cross sectional area of the clearance between said roll shell and said porous sleeve means.

5. A separator roll or the like as defined in claim 1 wherein said second passage means has a cross sectional area of approximately from 40% to 100% of the cross sectional area of the clearance between roll shell and said porous sleeve means.

6. A separator roll or the like as defined in claim 2 wherein said second passage means has a cross sectional area of approximately from 40% to 100% of the cross sectional area of the clearance between roll shell and said porous sleeve means.

7. A separator roll or the like as defined in claim 1 wherein said thrust rings have a plurality of circumferentially spaced flats in their outer circumference and said second passage means includes said flats.

8. A separator roll or the like as defined in claim 2 wherein said thrust rings have a plurality of circumferentially spaced flats in their outer circumference and said second passage means includes said flats.

9. A separator roll or the like as defined in claim 7 wherein said flats are approximately 0.004 inch to 0.01 inch deep.

10. A separator roll or the like as defined in claim 8 wherein said flats are approximately 0.004 inch to 0.01 inch deep.

11. In an air bearing separator roll or the like having a porous sleeve with exposed end faces, a roll shell surrounding the porous sleeve with a small radial clearance therebetween, thrust rings on the roll shell spaced closely adjacent the exposed ends of the porous sleeve, respectively, and an exhaust passage radially inwardly of the thrust rings, the improvement comprising, a second exhaust passage through the thrust rings at their outer margin whereby a substantial portion of the air in the radial clearance between the porous sleeve and the roll shell exhausts through said second passage means to reduce the cross flow across the end faces of the porous sleeve whereby the exhaust flow of the air from said radial clearance is substantially independent of the clearances between said end faces and said thrust rings.

12. In an air bearing having a porous sleeve with exposed end faces and a rotatable shell with annular thrust rings, the improvement comprising, a radial air bearing which includes an inner circumferential surface on said shell and the outer circumference of said porous sleeve with a film of flowing pressurized air therebetween, first exhaust means for said radial air bearing, a first thrust bearing which includes an end face of said porous sleeve and one of said thrust rings with a film of flowing pressurized air therebetween and second exhaust means for said first thrust bearing, and a second thrust bearing which includes the other end face of said porous sleeve and said other thrust ring with a film of flowing pressurized air and a third exhaust means for said second thrust bearing, each of said air bearings being supplied from a common plenum and operating substantially independently of one another with the cross flow of air from one air bearing to another air bearing being minimal.

13. An antifriction bearing comprising, support means including, a porous cylindrical portion, and impervious portions extending axially beyond the ends of the porous cylindrical portion, said impervious portions having an outer diameter less than the outer diameter of said porous cylindrical portion thereby providing exposed annular end faces on said porous cylindrical portion, said porous cylindrical portion having a porosity such that the flow through said end faces is from 12% to 50% of the flow through said cylindrical portion, an air receiving chamber bounded by said porous cylindrical portion and said impervious portions, a rotatable shell closely surrounding said porous cylindrical portion with a small radial clearance therebetween, thrust rings located adjacent the respective ends of said shell, said thrust means being axially spaced from said end faces and radially spaced from said impervious portions with a radial clearance greater than the radial clearance between said rotatable shell and said porous cylindrical portion, and exhaust passage means at the outer margin of said thrust rings, the exhaust passage means in each thrust ring having a cross sectional area which is approximately from 40% to 100% of the cross section area of the clearance between said porous cylindrical portion and said shell, passage means adapted to connect said air receiving chamber to a source of pressurized air whereby air delivered under pressure to said chamber will permeate said porous cylindrical portion and flow into the clearance between said porous cylindrical portion and said shell and through said exhaust passage means, said air also permeating through said exposed annular end faces and flowing into the clearances between said thrust rings and said end faces and then out between said thrust ring and said impervious portions.

References Cited

UNITED STATES PATENTS 3,374,039   3/1968   Voorhies _____ 308—122

MARTIN P. SCHWADRON, Primary Examiner

F. SUSKO, Assistant Examiner

U.S. Cl. X.R.

308—122